Figures 1, 2:
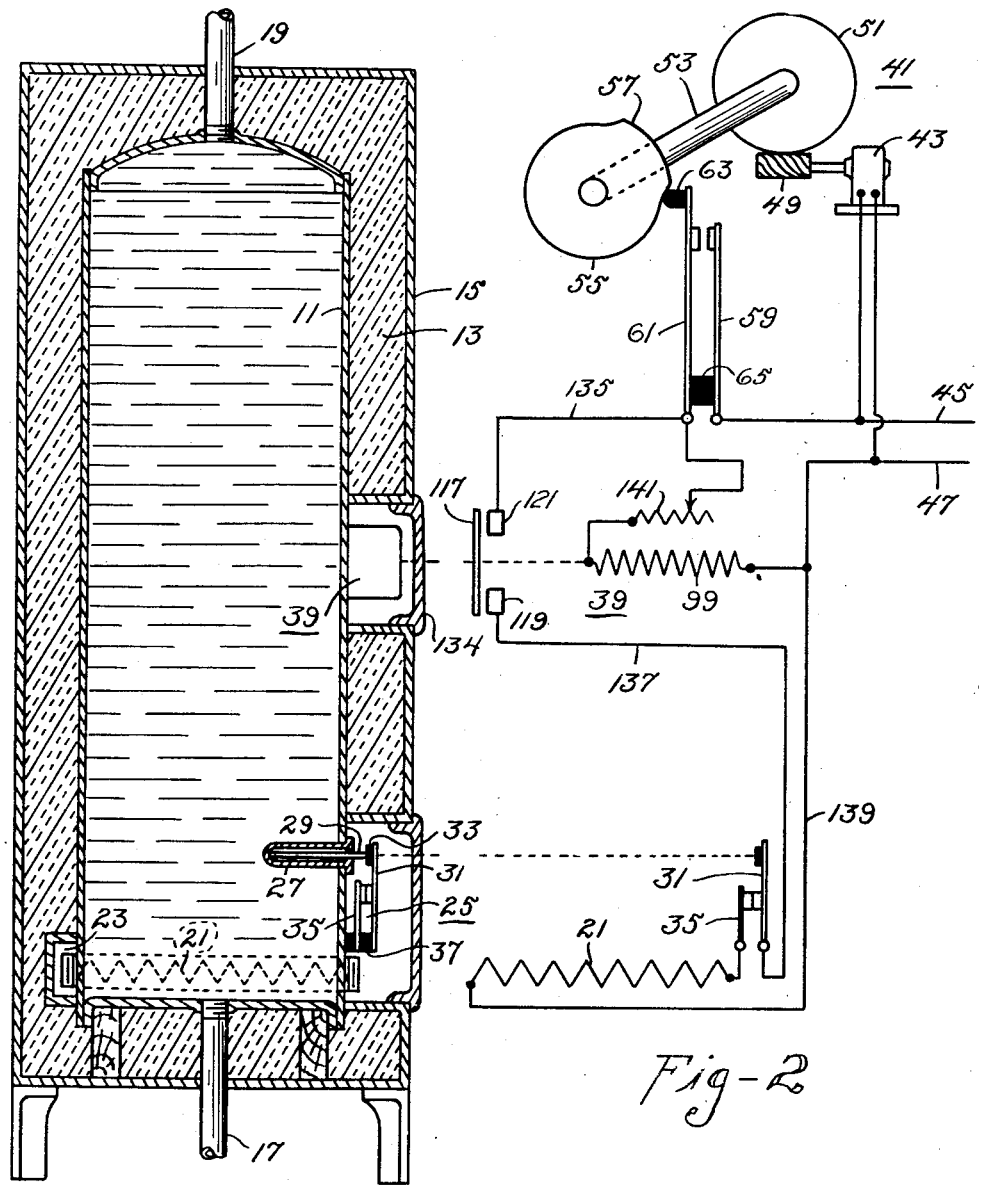

March 13, 1945. C. M. OSTERHELD 2,371,258
WATER HEATER CONTROL SYSTEM AND THERMAL RETARDER THEREFOR
Filed Oct. 15, 1943 3 Sheets-Sheet 1

INVENTOR.
CLARK M. OSTERHELD
BY
ATTORNEY

March 13, 1945.  C. M. OSTERHELD  2,371,258
WATER HEATER CONTROL SYSTEM AND THERMAL RETARDER THEREFOR
Filed Oct. 15, 1943  3 Sheets-Sheet 2

INVENTOR.
CLARK M. OSTERHELD
BY
ATTORNEY

March 13, 1945. C. M. OSTERHELD 2,371,258
WATER HEATER CONTROL SYSTEM AND THERMAL RETARDER THEREFOR
Filed Oct. 15, 1943 3 Sheets-Sheet 3
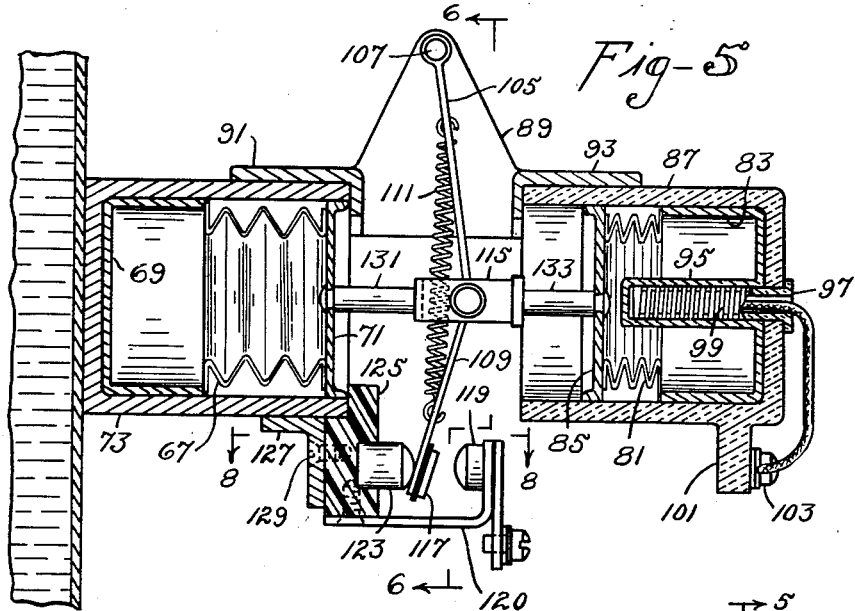
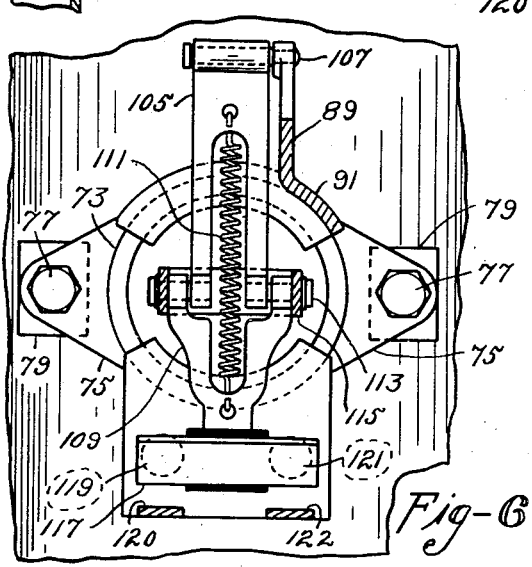
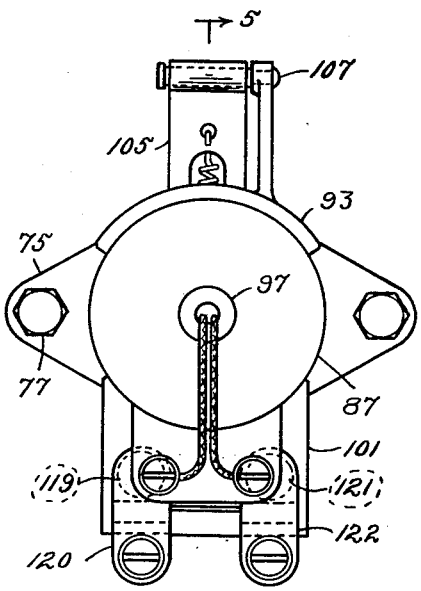
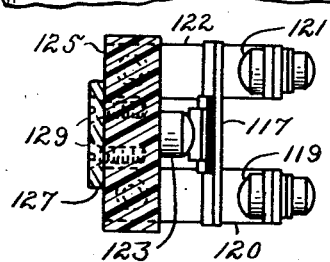
INVENTOR.
CLARK M. OSTERHELD
BY
ATTORNEY Patented Mar. 13, 1945

2,371,258

UNITED STATES PATENT OFFICE 2,371,258

WATER HEATER CONTROL SYSTEM AND THERMAL RETARDER THEREFOR

Clark M. Osterheld, Stoughton, Wis., assignor to McGraw Electric Company, Elgin, Ill., a corporation of Delaware Application October 15, 1943, Serial No. 506,450

19 Claims. (Cl. 219—39)

My invention relates to electric heating and particularly to tank water heater control systems.

An object of my invention is to provide a control system for electric heating means for a hot water tank that shall be energized immediately at the beginning of an off-peak period in case the tank contains a substantial quantity of cold water and that shall delay energization of the heating means for an adjustably predetermined time period in case the tank contains only a relatively small amount of cold water.

Another object of my invention is to provide a thermal retarder for use in a water heater control system that shall be relatively simple, inexpensive and easily manufactured and applied to a tank for control of a water heating system therefor.

Another object of my invention is to provide a thermal retarder comprising a plurality of expansion chambers and a snap acting switch actuated thereby.

Another object of my invention is to provide a thermal retarder heater control switch unit for use in a water heater control system comprising a pair of dissimilarly thermally-responsive expansion chambers and a snap-acting heater control switch actuated thereby.

Other objects of my invention will either be apparent from a description of one form of device and system embodying my invention or will be pointed out during the course of such description and set forth particularly in the appended claims.

Figure 3:
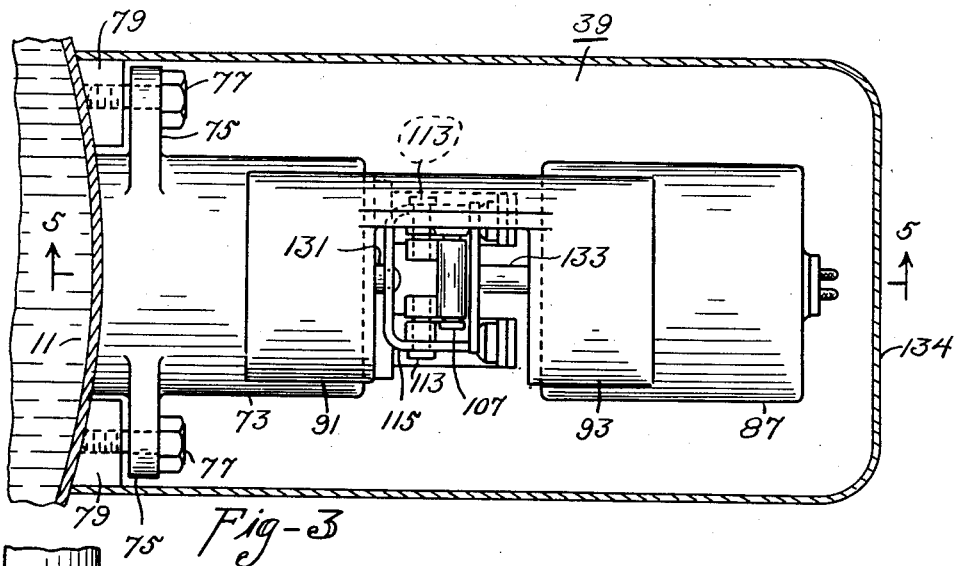
Figure 4:
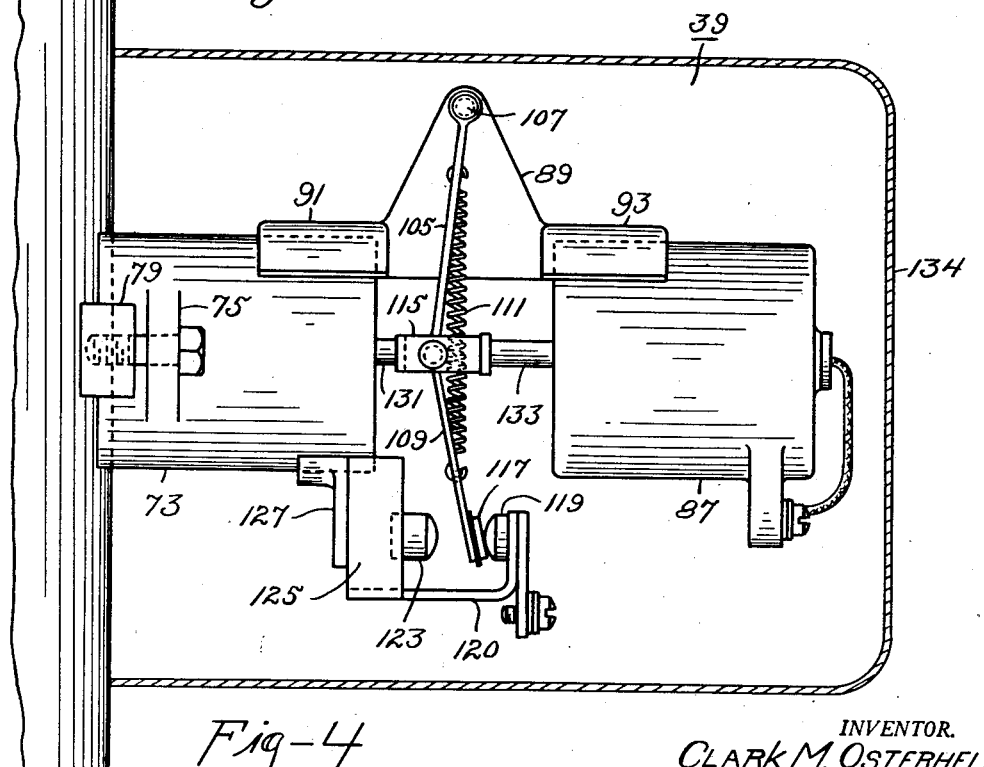

In the drawings,

Figure 1 is a vertical sectional view through a water tank having associated therewith a system and thermal retarder embodying my invention, Fig. 2 is a diagram of the electric circuits, Fig. 3 is a top plan view of my improved thermal retarder, Fig. 4 is a side elevational view of a thermal retarder as mounted on the side of a domestic hot water tank, Fig. 5 is a vertical sectional view taken on the line 5—5 of Figs. 3 and 7, Fig. 6 is a lateral sectional view taken on the line 6—6 of Fig. 5, Fig. 7 is an end elevational view of the parts shown in Fig. 4, and, Fig. 8 is a sectional view taken on the line 8—8 of Fig. 5.

Referring first of all to Figs. 1 and 2 of the drawings I have there illustrated a device and system embodying my invention as applied to an ordinary domestic hot water tank 11 which may be provided as is now usual, with heat-insulating material 13 which may be held in proper operative position around the tank by an outer casing 15. The tank 11 is provided with a lower cold water inlet 17 and an upper hot water outlet 19 all in a manner now well known in the art.

I provide preferably but not necessarily, a single electric heater 21 which may be placed around and electrically insulated from the tank in heat-conducting relation thereto adjacent the lower end thereof and may be positioned within an annular tunnel member 23.

I provide a first or main thermally-actuable heater control switch designated generally by the numeral 25 which I have illustrated as comprising a tubular member 27 extending into the tank 11 through an opening thereof the connection between the tube 27 and the tank being water-tight. The inner end of tube 27 is closed and supports an expansion rod 29 which is adapted to have its length increased by thermal expansion upon rise of temperature and to move a resilient contact arm 31. A block 33 of electric-insulating material is positioned on the free end of resilient contact arm 31 to be engaged by expansion rod 29. A contact on arm 31 is adapted to engage with and be disengaged from a contact on a substantially rigid contact arm 35 and for illustrative purposes I have shown the two arms as being supported by one or more blocks 37 of electric-insulating material.

I provide a thermal retarder heater control switch unit designated generally by the numeral 39 to be hereinafter described, which thermal retarder unit is secured against the outside surface of the tank at substantially the mid-portion thereof.

I provide a continuously operative timer designated generally by the numeral 41 which I have shown as including a sub-synchronous electric motor 43 adapted to be energized from an electric supply circuit including the conductors 45 and 47. A worm 49 is mounted on the shaft of the electric motor 43 and is adapted to engage with and cause rotation of a worm gear 51. This worm gear is mounted on one end of a shaft 53 and it is to be understood that suitable bearings are provided for shaft 53. At the other end of shaft 53 I provide a cam disc 55, the major portion of the outer periphery of which is of the same radius but a reduced peripheral portion 57 has a slightly larger uniform radius.

I provide a circuit switch including a substantially rigid contact arm 59 and a substantially resilient contact arm 61, the latter arm having a lug 63 of electric-insulating material on its free end adapted to engage the outer peripheral surface of cam disc 55. Arm 61 is normally biased out of engagement with arm 59. I have shown the two arms 59 and 61 as being suitably supported by a block 65 of electric-insulating material. While I have shown and described a particular form of continuously operative timer I do not desire to be limited thereto since any other form having the same general operation may be provided. When lug 63 is in engagement with the greater portion of the periphery of cam disc 55 the contact members on arms 59 and 61 will be out of engagement with each other but when lug 63 engages the portion 57 the two contact arms and particularly the contact members will be in electric engagement with each other or in circuit closing position. It is to be understood that the cam disc 55 rotates through one complete turn in a twenty-four hour day.

The peripheral extent of portion 57 of the cam disc may be such as to represent six hours and the positioning of the cam disc on the shaft may be such that lug 63 will be in engagement with portion 57 during the off-peak period during the night or from say twelve midnight to six a. m. Here again I do not desire to be limited to only a single off-peak period nor to the above described peripheral or time period represented thereby.

The thermal retarder 39 includes a first thermally expansive bellows or chamber 67 which, as shown particularly in Fig. 5 of the drawings, may be secured to a relatively rigid chamber 69, of cup shape, the inner end of bellows 67 being secured to the outer edge portion of member 69 while the outer edge portion of bellows 67 has secured thereto a closure member 71. It is to be understood that the closed chamber comprising the elements 67 and 69 will be filled with a thermally expansive substance which will vaporize at a predetermined temperature to cause outward movement of member 71 when the chambers 67 and 69 are subject to a relatively high temperature which in the present instance may be considered to be 150° F., the usual temperature of hot water in a tank.

I provide a heat-conducting support 73 for the bellows 67 and its cooperating member 69, which may be provided with a pair of lateral lugs 75 which are utilized to receive a pair of clamping bolts 77 extending into lugs 79 secured against the outside surface of tank 11, the bolts 77 having screw threaded engagement with the lugs 79 and the inner surface of member 73 being shaped to closely conform to the shape of the outer surface of tank 11 so that the flow of heat from the water in the tank through the wall of the tank and from there through support 73 and to the substance in the expansion chamber members 67 and 69 will have a relatively low thermal reluctance. I may point out here that the closure 71 is adapted to slide in the outer end portion of the substantially tubular support 73.

In juxta-position to the expansion chamber including members 67 and 69 I provide a second expansion bellows 81 the outer end of which is secured to a substantially rigid member 83 of cup-shape, the outer end portion of bellows 81 having secured thereto in a fluid-tight manner a closure 85. I provide a thermally expansive fluid in the closed bellows comprising members 81 and 83 which is not as expansive as that contained in the first above described expansion chamber.

I provide a support for the second expansion chamber in the shape of a member 87 of cup-shape, which is made of heat-insulating material. I provide means for supporting member 87 from member 73 by a member 89, which is of substantially inverted T-shape having end portions 91 and 93 which have arcuate seats therein to be suitably secured to members 73 and 87.

I provide means for heating the substance enclosed in the second expansion chamber comprising members 81 and 83 and for this purpose provide a tubular member 95 having a closed inner end which extends substantially axially of the cup-shaped member 83. I provide a support 97 in member 95 which may also be of tubular shape and which may have a low wattage heating coil 99 mounted thereon. Member 87 is provided with a depending lug 101 upon which terminal members 103 may be located to which the end portions of resistor 99 may be connected. I may here point out that the energization of heating coil 99 is controlled by the timer actuated circuit switch comprising contact arms 59 and 61.

I provide a snap acting switch between the spaced co-axially alined expansion chambers, this switch comprising a first toggle arm 105 the upper end of which is pivotally mounted to the upper end portion of member 89 as on a pivot pin 107. The lower end of arm 105 has pivotally secured thereto a lower toggle arm 109 and an over center spring 111 is provided therebetween all in a manner well known in the art. Reference to Fig. 6 in the drawings will show that the lower end of arm 105 and the upper end of arm 109 have an axial slot therein to receive spring 111. A pair of pivot pins 113 effect the pivotal connection between the two toggle arms 105 and 109, and it may be here pointed out that these pivot arms 113 have a pivotal mounting in a substantially rectangular frame 115.

The lower end of the lower toggle arm 109 has insulatedly mounted thereon a contact bridging member 117 which is adapted to engage with and be disengaged from a pair of terminals 119 and 121 supported by brackets 120 and 122. The free end of lower toggle arm 109 is adapted to move between the contact terminals 119 and 121 and a stop member 123, the latter being mounted on a block 125 of electric-insulating material which is secured against the front end of member 73 as by a bracket 127 and machine screws 129. It will be noted that closure member 71 is secured to frame 115 by a rod 131 while closure member 85 is secured to frame 115 by a rod 133. The thermal retarder switch unit is housed in a casing 134.

Referring to the position of the parts shown in Fig. 4 of the drawings it will be noted that contact bridging member 117 is in engagement with the two contact terminals 119 and 121 or is in circuit closing position. This will be the position of the contact bridging member 117 when the temperature of the expansion chamber 67 and its cooperating member 69 is relatively low, that is, on the order of 70°.

When the parts are in the positions shown in Fig. 5 of the drawings the temperature of the expansion chamber comprising parts 67 and 69 is at a relatively high value while the temperature of expansion chamber comprising parts 81 and 83 is relatively low and the arm 109 is in engagement with the stop member 123.

My thermal retarder heater control switch unit thus comprises a snap acting switch actuable by a pair of dissimilarly thermally-responsive expansion chambers so that it will operate in the desired manner under ordinary operating conditions. The switch must be in closed position when the tank is full of cold water and the heating coil 99 has been energized for only a short time. It may happen that the thermal retarder unit will be subjected to a temperature of 115° F. when a certain amount of hot water has been withdrawn from the tank and if the heating coil 99 has been energized for only a short length of time the switch must remain in closed position. On the other hand if the tank is full of hot water at a temperature of 150° F. or slightly higher, and has been standing under such condition for a length of time sufficient to cause the temperature of both expansion chambers to reach a value of 150° F. or slightly less, the switch must remain in open position.

To cause the switch to move from the open to the closed position when the thermal retarder is subject to tank water having a temperature of 150° F. or more, the second expansion chamber must be heated to a temperature of 300° F. or more depending on its thermal expansivity as compared to that of the first expansion chamber.

Referring now to Fig. 2 of the drawings it will be noted that the contact arm 59 is connected with supply circuit conductor 45 while contact arm 61 is connected by a conductor 135 with terminal 121. Terminal 119 is connected by a conductor 137 with contact arm 31 while contact arm 35 is connected with one terminal of the heater 21, the other terminal of heater 21 being connected by a conductor 139 with the other supply circuit conductor 47.

Let it be assumed that the tank is first filled with cold water and that this is done at about the start of the off-peak period when contact arm 61 will be in engagement with contact arm 59 to thereby aid in closing the heater circuit. Since thermal heater control switch 25 is also subject to cold water, the contact arms 31 and 35 will be in engagement with each other. The design, construction and adjustment of the thermal retarder 39 is such that under these conditions the left-hand expansion chamber will be contracted so that contact bridging member 117 will be in engagement with contact terminals 119 and 121 with the result that the heater energizing circuit will be closed as soon as lug 63 engages the portion 57 of the cam disc. Energization of the heater 21 is therefore effected as soon as the circuit switch driven by the timer 41 is closed and I may here point out that the timer may be temporarily changed as to its setting or suitable means may be provided, for causing contact arms 61 and 59 to engage each other for the starting up of the system.

Energization of the heater will continue until the inner expansion chamber is subject to the temperature of hot water, the temperature of which may be on the order of 150° F., when the expansion chamber will have expanded to thereby cause movement of the contact bridging member 117 to open circuit position substantially as shown in Fig. 5 of the drawings.

Closure of the time control circuit switch effected energization of the small auxiliary heater 99 in the second expansion chamber and for the start-off an adjustable rheostat 141 may be so adjusted that a greater current than normal traverses heater 99 so that the thermally expansive substance in the second expansion chamber will be heated sufficiently say within two and one-half or three hours, to cause expansion of the substance in the expansion chamber so that the contact bridging member 117 will be or remain in engagement with terminals 119 or 121. Energization of the heater 21 will therefore continue even though the first expansion chamber is subject to hot water with the result that substantially all of the water in the tank 11 will be heated to a preset temperature which, as has already been noted, may be on the order of 150° F. When substantially all of the water in the tank has been heated the main thermal heater control switch 25 will open the heater circuit provided that substantially all of the water in the tank has been heated within the prescribed period of off-peak time—six hours. If not all of the water in the tank was heated during this off-peak period de-energization of the entire system will be effected by the disengagement of contact arms 61 and 59 at the end of the off-peak period.

Let it now be assumed that only a relatively small quantity of hot water was withdrawn from the tank such that only the lower or main thermal switch was subject to cold water, with the result that it would move to its closed circuit position. If this occurred during the daytime period of a twenty-four hour day, energization of the heater 21 would not occur until a predetermined time after the start of the off-peak period, at the start of which the timer-controlled switch would be closed with resultant energization of heater 99. After a preset length of time dependent upon the amount of current traversing rheostat 141 and heater 99 the thermal retarder switch would be moved to the position shown in Fig. 4 of the drawings with the result that heater 21 would be energized.

Let it now be assumed that a greater quantity of hot water was withdrawn from the tank so that the thermal retarder unit itself is subject to the temperature of cold water. This would have the result that the thermal retarder switch would be in the position shown in Fig. 4 of the drawings with the result that closure of the timer controlled switch at the start of the off-peak period would result in immediate energization of the heater 21 on the tank so that substantially six hours would be available to heat up the cold water in the tank to the predetermined temperature.

It is therefore evident that my invention provides a relatively simple heater control system in combination with a timer controlled circuit closing and circuit opening switch which latter is effective to cause energization of an electric heater comprising a part of the thermal retarder heater control switch unit to cause a delay of an adjustably predetermined period of time after the start of an off-peak period before energization of the electric heater for the tank may be effected.

Various modifications may be made in the device and system embodying my invention and all such modifications clearly covered by the appended claims shall be considered to be covered thereby.

I claim as my invention:

1. A water heater control system for a hot water tank having an electric heater and a thermal retarder switch unit comprising a first expansion chamber having a thermally-expansive substance therein adapted to be mounted on a hot water tank intermediate the ends thereof subject to tank water temperature, a second expansion chamber supported by said first chamber and having a thermally-expansive substance therein, an electric heating coil for said second chamber and a heater control switch actuable by said two expansion chambers and adapted to be moved to heater-energizing position when the thermal condition of said two expansion chambers is substantially the same.

2. A water heater control system for a hot water tank having an electric heater and a thermal retarder switch unit comprising a first expansion chamber having a thermally-expansive substance therein adapted to be mounted on a hot water tank intermediate the ends thereof subject to tank water temperature, a second expansion chamber supported by said first chamber and having a thermally-expansive substance therein, an electric heating coil for said second chamber and a heater control switch actuable by said two expansion chambers and adapted to be moved to heater-energizing position when the temperature of said two expansion chambers is at substantially the same relatively low value.

3. A water heater control system for a hot water tank having an electric heater and a thermal retarder switch unit comprising a first expansion chamber having a thermally-expansive substance therein adapted to be mounted on a hot water tank intermediate the ends thereof subject to tank water temperature, a second expansion chamber supported by said first chamber and having a thermally-expansive substance therein, an electric heating coil for said second chamber and a heater control switch actuable by said two expansion chambers and adapted to be moved to heater-energizing position when the temperature of said two expansion chambers is at a predetermined relatively high value.

4. A water heater control system for a hot water tank having an electric heater and a thermal retarder switch unit comprising a first expansion chamber having a thermally-expansive substance therein and adapted to be mounted on a hot water tank intermediate the ends thereof subject to tank water temperature, a second expansion chamber supported by said first chamber with heat-insulation therebetween and having a thermally-expansive substance therein, an electric heating coil in said second chamber and a heater control switch actuable by said two chambers and adapted to be moved into heater-energizing position when the first chamber is subject to the temperature of cold water in the tank and said second chamber is at substantially room temperature and adapted to be moved to heater-denergizing position when enough water in the tank has been heated to a predetermined high temperature to subject said first chamber to the temperature of said heated water and the temperature of said second chamber is at substantially room temperature.

5. A water heater control system for a hot water tank having an electric heater and a thermal retarder switch unit comprising a first expansion chamber having a thermally-expansive substance therein and adapted to be mounted on a hot water tank intermediate the ends thereof subject to tank water temperature, a second expansion chamber supported by said first chamber with heat-insulation therebetween and having a thermally-expansive substance therein, an electric heating coil in said second chamber and a heater control switch actuable by said two chambers and adapted to be moved into heater emergizing position when the first chamber is subject to the temperature of cold water in the tank and said second chamber is at substantially room temperature and adapted to be moved to heater-deenergizing position when enough water in the tank has been heated to a predetermined high temperature to subject said first chamber to the temperature of said heated water and the temperature of said second chamber is at substantially room temperature and is adapted to be moved into heater-energizing position with a predetermined time delay period when said first chamber is subject to the temperature of said heated water and the heating coil in said second chamber has been energized.

6. A water heater control system for a hot water tank having an electric heater, said system comprising a first thermally-actuable heater control switch subject to tank water temperature near the lower end of the tank and adapted to be moved to open position when substantially all of the water in the tank is hot, a timer actuated heater control switch adapted to be closed during an off-peak period and a thermal retarder switch unit comprising a first thermal-expansion chamber adapted to be mounted on a tank intermediate the ends thereof subject to tank water temperature, a second thermal-expansion chamber heat-insulatedly supported by said first chamber, an electric heating coil in said second chamber controlled by said timer controlled switch and a third heater control switch actuable by said two expansion chambers and adapted to be moved into heater-energizing position when the first chamber is subject to the temperature of cold water and said second chamber is at substantially room temperature and adapted to be moved to heater-deenergizing position when enough water in the tank has been heated to a predetermined high temperature to subject said first chamber to the temperature of said hot water and the temperature of said second chamber is at substantially room value.

7. A water heater control system for a hot water tank having an electric heater and a thermal retarder switch unit comprising a first expansion chamber having a thermally-expansive substance therein and adapted to be mounted on a hot water tank intermediate the ends thereof subject to tank water temperature, a second expansion chamber supported by said first chamber with heat-insulation therebetween and having a thermally-expansive substance therein, an electric heating coil in said second chamber and a heater control switch actuable by said two chambers and adapted to be moved into heater-energizing position when the first chamber is subject to the temperature of cold water in the tank and said second chamber is at substantially room temperature and adapted to be moved to heater-deenergizing position when enough water in the tank has been heated to a predetermined high temperature to subject said first chamber to the temperature of said heated water and the temperature of said second chamber is at substantially room temperature and is adapted to be moved into heater-energizing position with a predetermined time delay period when said first chamber is subject to the temperature of said heated water and the heating coil in said second chamber has been energized.

8. A water heater control system for a hot water tank having an electric heater, said system comprising a first thermally-actuable heater control switch subject to tank water temperature near the lower end of the tank and adapted to be moved to open position when substantially all of the water in the tank is hot, a timer actuated heater control switch adapted to be closed during an off-peak period and a thermal retarder switch unit comprising a first thermal-expansion chamber adapted to be mounted on a tank intermediate the ends thereof subject to tank water temperature, a second thermal-expansion chamber heat-insulatedly supported by said first chamber, an electric heating coil in said second chamber controlled by said timer controlled switch and a third heater control switch actuable by said two expansion chambers said three heater control switches being jointly effective to cause energization of said electric heater simultaneously with the closing of the timer actuated switch in case the thermal retarder is subject to cold water.

9. A water heater control system for a hot water tank having an electric heater, said system comprising a first thermally-actuable heater control switch subject to tank water temperature near the lower end of the tank and adapted to be moved to open position when substantially all of the water in the tank is hot, a timer actuated heater control switch adapted to be closed during an off-peak period and a thermal retarder switch unit comprising a first thermal-expansion chamber adapted to be mounted on a tank intermediate the ends thereof subject to tank water temperature, a second thermal-expansion chamber heat-insulatedly supported by said first chamber, an electric heating coil in said second chamber controlled by said timer controlled switch and a third heater control switch actuable by said two expansion chambers said three heater control switches being jointly effective to cause energization of said electric heater with a predetermined period of time delay after closing of said timer actuated switch in case the thermal retarder is subject to hot water.

10. A water heater control system for a hot water tank having an electric heater, said system comprising a first thermally-actuable heater control switch subject to tank water temperature near the lower end of the tank and adapted to be moved to open position when substantially all of the water in the tank is hot, a timer actuated heater control switch adapted to be closed during an off-peak period and a thermal retarder switch unit comprising a first thermal-expansion chamber adapted to be mounted on a tank intermediate the ends thereof subject to tank water temperature, a second thermal-expansion chamber heat-insulatedly supported by said first chamber, an electric heating coil in said second chamber controlled by said timer controlled switch and a third heater control switch actuable by said two expansion chambers said three heater control switches being jointly effective to cause energization of said electric heater simultaneously with the closing of the timer actuated switch in case the thermal retarder is subject to cold water and said first thermally-actuable switch being effective to cause deenergization of said electric heater when the tank is full of hot water.

11. A water heater control system for a hot water tank having an electric heater, said system comprising a first thermally-actuable heater control switch subject to tank water temperature near the lower end of the tank and adapted to be moved to open position when substantially all of the water in the tank is hot, a timer actuated heater control switch adapted to be closed during an off-peak period and a thermal retarder switch unit comprising a first thermal-expansion chamber adapted to be mounted on a tank intermediate the ends thereof subject to tank water temperature, a second thermal-expansion chamber heat-insulatedly supported by said first chamber, an electric heating coil in said second chamber controlled by said timer controlled switch and a third heater control switch actuable by said two expansion chambers said three heater control switches being jointly effective to cause energization of said electric heater with a predetermined period of time delay after closing of said timer actuated switch in case the thermal retarder is subject to hot water and said first thermally-actuable switch being effective to cause deenergization of said electric heater when the tank is full of hot water.

12. A thermal retarder switch unit for controlling the energization of an electric heater for a hot water tank, comprising a first expansion chamber, a heat conducting support for said first chamber adapted to be secured to a hot water tank in good heat receiving relation thereto intermediate the ends thereof, a second expansion chamber in juxta-position to said first chamber, a heat-insulating support for said second chamber secured to said first chamber, a heating coil in said second chamber and a heater control switch movable by the joint action of said two expansion chambers into heater energizing position when both chambers are at substantially room temperature, into heater-deenergizing position when said first chamber is subject to hot water in the tank and said second chamber is at substantially room temperature and into heater-energizing position with a predetermined time delay period when said first chamber is subject to hot water in the tank and said heating coil in said second chamber has been energized.

13. A water heater control system for a hot water tank having an electric heater, comprising a thermal retarder heater control switch unit including two dissimilarly thermally-responsive expansion chambers adapted to be mounted on a tank intermediate the ends thereof and in heat-receiving relation with the temperature of the tank water, a heating coil for said second expansion chamber, and a heater control switch actuable by said second expansion chamber into closed position with a predetermined time period of delay after withdrawal of a predetermined relatively small quantity of hot water from the tank.

14. A water heater control system for a hot water tank having an electric heater, comprising a thermal retarder heater control switch unit including two dissimilarly thermally-responsive expansion chambers adapted to be mounted on a tank intermediate the ends thereof and in heat-receiving relation with the temperature of the tank water and a heater control switch actuable by said two expansion chambers into closed position with a predetermined time period of delay after withdrawal of a predetermined relatively small quantity of hot water from the tank and actuable into closed position immediately after withdrawal of sufficient hot water from the tank to cause said thermal retarder switch unit to be subject to cold water.

15. A system as set forth in claim 5 and including a manually-adjustable means for varying said predetermined time delay period.

16. A system as set forth in claim 7 and including a manually-adjustable means for varying said predetermined time delay period.

17. A system as set forth in claim 9 and including a manually-adjustable means for varying said predetermined time delay period.

18. A thermal retarder switch unit for controlling the energization of an electric heater for a hot water tank, comprising a first expansion chamber having high expansivity and adapted to be mounted on the outside of a hot water tank in good heat-receiving relation thereto intermediate the ends thereof, a second expansion chamber having lower expansivity and adapted to be operatively supported from the outside of a tank in juxtaposition to said first chamber, a heating coil for said second chamber and a heater control switch movable by the joint action of said two expansion chambers into heater energizing position when both chambers are subject to cold water in the tank, into heater-deenergizing position when said two chambers are subject to hot water in the tank and into heater-energizing position with a predetermined time delay period when said first chamber is subject to hot water in the tank and said heating coil for the second chamber has been energized for a predetermined length of time.

19. A thermal retarder switch unit for controlling the energization of an electric heater for a hot water tank, comprising a first expansion chamber having high expansivity and adapted to be mounted on the outside of a hot water tank in good heat-receiving relation thereto intermediate the ends thereof, a second expansion chamber having lower expansivity and adapted to be operatively supported from the outside of a tank in juxtaposition to said first chamber, a heating coil for said second chamber and a heater control switch movable by the joint action of said two expansion chambers into heater energizing position when both chambers are subject to a temperature on the order of 60° F. to 70° F., into heater-deenergizing position when both chambers are subject to a temperature on the order of 150° F. and into heater-energizing position when said first chamber is subject to a temperature on the order of 150° F. and said second chamber is subject to a temperature on the order of 300° F.

CLARK M. OSTERHELD.